May 2, 1972 K. LÖVOLD 3,660,546
PROCESS FOR THE PREPARATION OF BLACK POWDER
Filed Feb. 4, 1970
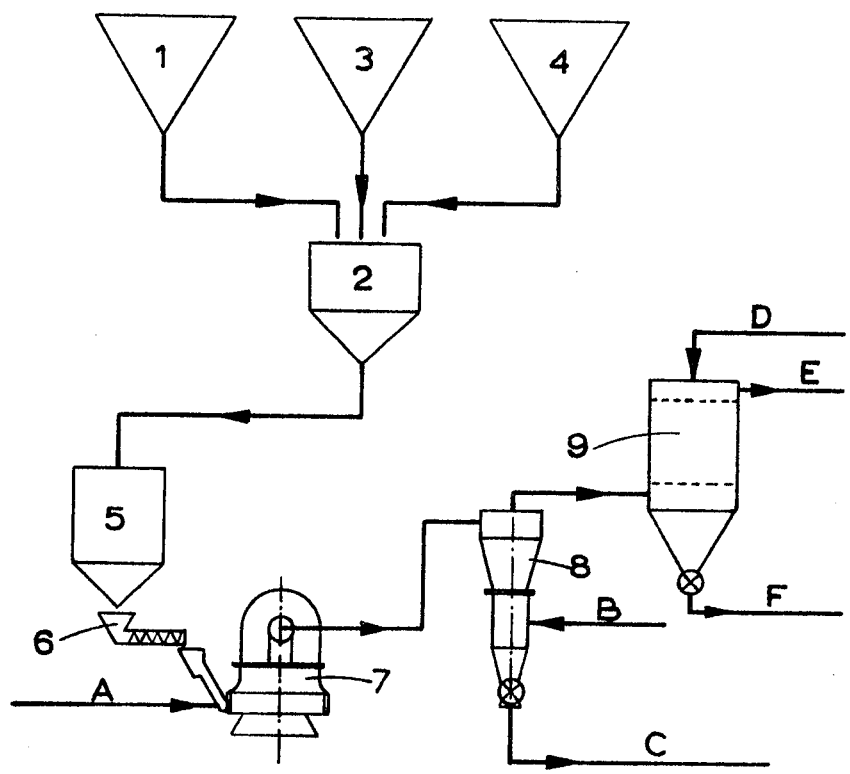
INVENTOR
Kjell Lövold
By
ATTORNEY United States Patent Office 3,660,546
Patented May 2, 1972

3,660,546
PROCESS FOR THE PREPARATION OF
BLACK POWDER
Kjell Lövold, Nittedal, Norway, assignor to Norsk
Spraengstofindustri A/S, Oslo, Norway
Filed Feb. 4, 1970, Ser. No. 8,540
Int. Cl. C06b 21/02
U.S. Cl. 264—3 C                                  5 Claims

ABSTRACT OF THE DISCLOSURE

The present invention relates to a process for the preparation of meal black powder from the raw materials potassium nitrate, sulphur and activated carbon, wherein the raw materials are mixed and simultaneously ground and pulverized under continuous introduction into a jet mill of known construction. The invention also relates to the further processing of the meal black powder, comprising compacting, disintegration, sieving and polishing the obtained black powder granules, wherein the polishing is carried out in a similar jet mill and pulverized graphite is blown into the mill for further polishing of the powder granules.

In the preparation of black powder, the most time-consuming part of the process has so far been the pulverization of the three raw materials potassium nitrate, sulphur and charcoal, and the mixing and grinding together of these raw materials. Said last part of the process has been called incorporation. The product obtained after incorporation is called meal black powder. In addition to being very time-consuming the two process steps pulverization and incorporation have also been very space-requiring and expensive. Due to the explosion hazard the pulverization of the raw materials has been carried out separately for each raw material or for instance, potassium nitrate separately and sulphur and charcoal together, or potassium nitrate with some charcoal separately and sulphur and the rest of the charcoal separately.

The pulverization has been carried out for instance on ball mills, needle mills or hammer mills. The grinding on the ball mills has taken from 6–12 hours and in some cases even more time. Due to the explosion hazard the incorporation has been carried out in small batches, up to about 100 kilograms, in slow-running special apparatus, such as ball mills, stamping mills or wheels mills. It has lasted for 7 hours or more per batch. Explosion accidents during the incorporation have not been uncommon.

The term "incorporation" will be explained more wholly in the following. Hitherto it has not been fully understood what it really consists of, but through experiments it has been shown that it primarily consists of a further subdivision of the raw materials, particularly charcoal, and of course a mixing of the raw materials. The reactivity of the charcoal is of fundamental importance for the effect of a black powder. With high reactivity a powerful and uniformly acting black powder is obtained. The reactivity of the charcoal depends on its content of free radicals, and this content increases with increasing subdivision. This has ben shown by measurements of electron spin resonance in charcoal and in the finished black powder.

The further processing of the meal black powder usually consists of the following steps:

Compacting (compressing)
Disintegration
Sieving
Polishing

Polishing of black powder is traditionally divided into two steps:

(1) Glazing
(2) Finishing

Hitherto the polishing has been carried out as follows: A certain amount of black powder from the disintegrator is charged to a rotating drum. The amount varies according to the setup on the place of production, but is usually from 250 to 1500 kilograms per drum. This amount is rotated for 3–7 hours at 12–20 rotations per minute. During this process the friction between the individual granules abrades the edges of the black powder so that they become rounder and smoother. This is called glazing. The duration of the glazing depends on the degree of abrasion desired for the finished black powder. After the glazing generally follows a finishing polishing. This takes 1–2 hours and is performed in the same drum, consecutively and in the same manner as the glazing. The only difference is that from 0.1 to 1.0% finely pulverized graphite is added.

During this part of the polishing the graphite deposits as a thin film on the outside of the black powder granules and makes them shiny, smooth, somewhat more electrically conducting and somewhat more insensitive to moisture. During the polishing the temperature in the black powder mass rises due to the work of friction to which the granules are subjected, and temperatures of up to 70° C. have been recorded. The disadvantage of the polishing is that it takes such a long time and a relatively large amount of black powder must therefore be present in each polishing drum. For instance, a plant for 300 kilograms per hour will have the effect that an amount of up to 2700 kilograms of black powder is accumulated in the polishing house. For safety reasons this is most undesirable. On the other hand, an increase in the rate of abrasion of the granules will necessarily lead to an increased heating of the black powder. The ignition temperature of the black powder is about 300° C., and it is obvious that it is necessary to work well below this limit to be on the safe side. Thus, some kind of means for cooling during the polishing seems necessary.

The object of the invention is to eliminate all the disadvantages mentioned above and replace the pulverization and incorporation with one single treatment in a fast-running continuous apparatus.

Another object of the invention is to perform the polishing of the black powder in a continuous apparatus of similar type as the one used for the pulverization.

Although the type of coal used is charcoal other types of activated carbon may as well be used.

We now return to the first part of the process.

Some of the effect of the incorporation consists of an embedding of sulphur and/or potassium nitrate in the pores of the charcoal. Thus, to obtain this effect all three raw materials have to be handled together in the mill used.

The invention provides a new process for the preparation of meal black powder from the raw materials potassium nitrate, sulphur and active carbon, and it is characterized in that the raw materials are blended in the proper proportions and then further mixed and simultaneously ground and pulverized with continuous introduction into a jet mill of known construction of the type comprising an annular chamber having tangential inlets for pressurized air which is converted into turbulent jets with supersonic speed, whereby the particles strike each other and are sub-divided, and the finished meal black powder is collected in a cyclone or similar means for possible further processing.

To utilize further the advantage with respect to economy and safety in performing the first part of the process, viz mixing, pulverization and incorporation, continuously and with remote control, it is natural to try to carry out the subsequent steps in the same way. This does not present particular difficulties with respect to compacting, disintegration and sieving, but as mentioned above the situation is different with the polishing.

On the basis of this realisation we got the idea to try the jet mill which is used for the preparation of meal black powder also for performing the polishing. We were certainly aware that there was a real chance that the mill would be too powerful so that the granules were pulverized to dust instead of just abraded at the edges. In the beginning this was exactly what happened. Later we found that a fully satisfactory polishing of the black powder can take place under specific conditions which will appear from the following.

Thus, the invention also provides a process for the further processing of the meal black powder by compacting, disintegrating, sieving and polishing the black powder, and the process is characterized in that the polishing is carried out in the same jet mill as the one in which the grinding was carried out, but for the polishing the jet mill is loaded with at least 10 to 20 times as much black powder as during the pulverization, and the pressure of air introduced into the mill is reduced to very low values, and for further polishing of the black powder granules a fine jet of pulverized graphite is blown into the mill at a point after the tangential inlet of the air.

The process for the preparation of meal black powder according to the invention shall be described more in detail in the following.

The raw materials potassium nitrate, charcoal and sulphur are mixed in the proper and desired proportions in a known manner, either by purely mechanical mixing, by tumbling, by air agitation or by any other known method. The particle size of the potassium nitrate and sulphur is preferably about 1 mm., while it may be $1\mu$ to 1 mm. for the charcoal. This means that the charcoal may be pulverized in advance, if desired.

When the particle size of potassium nitrate and sulphur is relatively large, i.e. about 1 mm., the mixture is harmless, not explosive and only generally combustible like other combustible substances.

The above blended mixture is introduced continuously in an air jet in a per se known apparatus, called jet mill or steam or air jet pulverizer. In said apparatus the mixture is further ground by being carried by a separate stream of air into a zone in which the velocity of the air is supersonic. In said zone a number of heavy collisions between the particles takes place due to the high air velocity collisions which are so vigorous that the particles are broken to pieces and in this manner are ground to particle sizes which may go below $1\mu$.

The high air velocity is provided in a known manner by passing pressurized air through specifically shaped nozzles, whereafter it is given the opportunity to expand.

Such jet mills are well known for pulverizing several substances, but have not previously been used for the preparation of black powder.

It may seem risky to mix and pulverize the three components simultaneously, and many warnings were therefore received when the introductory experiments were done. The pulverization of sulphur alone represents a great risk of ignition, presumably due to the great accumulation of static electricity taking place. However, even when all three starting materials are added simultaneously and the oxidizing agent ($KNO_3$) thus collides with the reducing agents (S and C), collisions which presumably will lead to local rises in temperature, it turns out that the sub-division and mixing take place without any sign of ignition of the powder. This cannot be explained fully. It is assumed that one of the reasons is that the air expands so that a cooling occurs in the apparatus.

Thus, it has proved to be unnecessary to use an inert gas such as nitrogen in the apparatus, which in case would have lead to great extra costs since it would then have been necessary to operate with a closed system.

The incorporation effect consisting of embedding sulphur and/or potassium nitrate in the pores of the charcoal takes place in full extent in the vigorous collisions between the different raw materials.

The finished meal black powder is discharged from the mill by means of the air stream and is recovered in a cyclone or the like. Larger particles are recycled to the first zone.

In this manner the subdivision and incorporation takes place simultaneously and only by means of an air jet in an apparatus without any mechanically movable parts. This is of great importance for the security during the preparation of the black powder. Further, the preparation may take place automatically without any attention or control, which means that humans will not have to be present in a possible danger zone. The residence time in the mixing apparatus is very short so that the amount of black powder in the grinding apparatus itself is only in the order of 200 grams. This is also of great importance for the security. Further, the black powder may be prepared with low expenses and in particular the wage-proportion will be low.

The meal black powder prepared in this manner has been found to be quite uniformly mixed. It is easily compressible and may therefore without any difficulty be further processed to any desired type of black powder. Different types of black powder have been prepared in this manner and they have shown normal values in shooting in guns, burning in fuse and ignition tube and with respect to electron spin concentration.

The meal black powder may be prepared entirely dry, or, if desired, water may be added to the meal black powder in the cyclone. Previously it was common to moisten the meal black powder with 3–5% water in order to bind the dust to some extent, increase the compressibility and increase the safety. Meal black powder prepared according to the process of the invention has surprisingly proved to dust insignificantly and to be very easily compressible due to the lower particle size, particularly of sulphur and potassium nitrate. Addition of water is therefore not necessary, but it may be an advantage to add water, for instance for security reasons.

The apparatus for grinding and incorporation according to the principle of the present invention operates continuously and may be adapted for all possible capacities from a few hectograms up to several tons per hour.

In the polishing of the black powder the mill is loaded with at least 10 to 20 times as much black powder as for the pulverization, while the pressure of the air introduced through the tangential inlets of the jet mill is reduced from a relatively high pressure, for instance 7 to 8 kilograms per square centimeter to a very low pressure, preferably in the range 0.1 to 0.5 kgm. per sq. cm.

The graphite coating is deposited on the black powder in the same operation and in the same mill by blowing a fine jet of pulverized graphite into the mill at a point after the tangential inlet of the working air.

Adjusted in this manner the mill provides a fully satisfactory polishing with high speed and without noticeable heating of the black powder. The accumulation of black powder during the polishing will of course depend on the size of the rest of the plant, but for a plant having a capacity of for instance 300 kgms. per hour, the amount will not exceed 4 kgms., in contrast to up to 2700 kgms. in the prior art as mentioned above.

The following is an example of an embodiment of the invention, and it should be noted that the application should not be limited thereto.

EXAMPLE

The invention is best understood in connection with the enclosed flow sheet in which:

A=Pressurized air
B=Water
C=Meal black powder
D=Pressurized air for cleaning
E=Air outlet
F=Dust discharge The jet mill 7 is fed from the hopper 5. The hopper can take 200 kgms. of the raw material blend (potassium nitrate, carbon, sulphur), and a suitable metering device 6, such as a vibrating chute or a feeding screw, is continuously drawing a constant amount of 300 kgms. per hour from the hopper 5. When there are about 90 kgms. left in the hopper, a level indicator reacts to start the vibrator chute below the hopper for potassium nitrate 1. This charges 75 kgms. potassium nitrate into the scale 2. The scale stops the charging when 75 kgms. have been reached, and the vibrator chute under the hopper for sulphur 3 is then started. It charges 10 kgms., and then the vibrator chute for charcoal 4 is started. It charges 15 kgms. The scale 2 is built according to the strain gauges principle and also acts as a blending means, having double bottom connected to pressurized air. The pressurized air is automatically turned on when the weighing is finished, and the agitation lasts for a certain period of time, for instance, 3 minutes. Then the bottom valve of the scale starts to deliver the mix to the conveyor belt which runs continuously and charges the mix to the hopper 5. After the scale has been emptied the whole plant stands still for weighing and blending until the level indicator in the hopper 5 starts on a new cycle. Thus, with a total capacity of 300 kgms. per hour 3 weighings will take place per hour. The jet mill 7 runs continuously and delivers a finished meal black powder to the cyclone 8. The excess of air is blown off at the top through the filter 9. The filter rinses itself by means of an automatic, pulsing reversion of the air stream through the filter. In the lower part of the cyclone is built in a system of fine water nozzles delivering 9 litres of water per hour, giving the powder a moisture content of 3%. The meal black powder is continuously discharged from the cyclone through the rotating valve in the bottom, and the conveyor belt delivers it for possible further processing.

I claim:

1. A process for the preparation of meal black powder from the raw materials potassium nitrate, sulphur and activated carbon comprising blending the raw materials in the proper proportions, then further mixing and simultaneously grinding and pulverizing said materials with continuous introduction into a jet mill without any mechanically moving parts, introducing pressurized air through tangential inlets in said jet mill, converting said air to turbulent jets having supersonic speed to subdivide the particles by striking each other, and then collecting the finished meal black powder in a cyclone for further processing.

2. The process of claim 1 wherein said potassium nitrate and sulphur are subdivided to a particle size of about 1 mm. before said blending.

3. The process of claim 1 wherein said activated carbon is prepulverized in a jet mill to a particle size of about $1\mu$.

4. A process for the further processing of meal black powder prepared according to claim 1 comprising polishing said powder in a jet mill loaded with at least 10 to 20 times as much black powder as during said pulverizing, reducing the pressure of air introduced into said mill to a very low value, and then further polishing the black powder granules by blowing a fine jet of pulverized graphite into said mill at a point after a tangential inlet for said air.

5. The process of claim 4 wherein the pressure of the air introduced into said jet mill is reduced to a value in the range 0.1 to 0.5 kilogram per square centimeter.

References Cited
UNITED STATES PATENTS

| | | | |
|---|---|---|---|
| 1,308,342 | 7/1919 | Du Pont | 149—72 |
| 1,438,759 | 12/1922 | Gray | 149—72 X |
| 2,415,848 | 2/1947 | Rinkenbach et al. | 149—72 |

CARL QUARFORTH, Primary Examiner

S. J. LECHERT, Jr., Assistant Examiner

U.S. Cl. X.R.

149—72

UNITED STATES PATENT OFFICE
CERTIFICATE OF CORRECTION

Patent No. 3,660,546  Dated May 2, 1972

Inventor(s) KJELL LOVOLD

It is certified that error appears in the above-identified patent and that said Letters Patent are hereby corrected as shown below:

Column 1, in the heading, insert the following:

-- Priority claimed: Norway   Patent Application
No. 466/69 filed February 6, 1969

Norway   Patent Application
No. 4918/69 filed December 12, 1969 --

Signed and sealed this 26th day of March 1974.

(SEAL)
Attest:

EDWARD M. FLETCHER, JR.            C. MARSHALL DANN
Attesting Officer                  Commissioner of Patents